US012623945B2

(12) United States Patent
Arregui Letamendi

(10) Patent No.: US 12,623,945 B2
(45) Date of Patent: May 12, 2026

(54) METHOD OF AUTOMATIC MASS PRODUCTION OF GLASS CONTAINERS, OBTAINED GLASS CONTAINERS AND MOLD FOR OBTAINING SAME

(71) Applicant: DSIGNTANK, SL, Barcelona (ES)

(72) Inventor: Jokin Arregui Letamendi, Barcelona (ES)

( * ) Notice: Subject to any disclaimer, the term of this patent is extended or adjusted under 35 U.S.C. 154(b) by 511 days.

(21) Appl. No.: 18/018,606

(22) PCT Filed: Jul. 30, 2021

(86) PCT No.: PCT/EP2021/071450
§ 371 (c)(1),
(2) Date: Jan. 30, 2023

(87) PCT Pub. No.: WO2022/023549
PCT Pub. Date: Feb. 3, 2022

(65) Prior Publication Data
US 2023/0295030 A1     Sep. 21, 2023

(30) Foreign Application Priority Data

Jul. 31, 2020   (ES) ............................ ES202031723U

(51) Int. Cl.
*C03B 9/347*      (2006.01)
*B65D 1/02*       (2006.01)
*C03B 9/41*       (2006.01)

(52) U.S. Cl.
CPC ............ *C03B 9/347* (2013.01); *B65D 1/0207* (2013.01); *C03B 9/41* (2013.01)

(58) Field of Classification Search
CPC .......... B65D 1/0207; B65D 1/40; B65D 1/32; B65D 1/0223; B65D 1/02
See application file for complete search history.

(56) References Cited

U.S. PATENT DOCUMENTS

2012/0031915 A1* 2/2012 Hewison .............. B65D 1/0223
                                                  220/669
2013/0071589 A1* 3/2013 Hannington ............ B32B 27/32
                                                  264/293
2015/0353409 A1* 12/2015 Markel ..................... C03B 9/32
                                                  65/72

* cited by examiner

*Primary Examiner* — Laura A Auer
(74) *Attorney, Agent, or Firm* — Eugenio J. Torres-Oyola; Victor M. Rodriguez-Reyes; Rafael Rodriguez-Muriel

(57)                ABSTRACT

The invention relates to a method of automatic mass production of glass containers with texture which comprises producing a mold including a texture of non-parametric three-dimensional motifs (5) by means of protuberances, with said motifs being irregular, non-geometric, and non-figurative and being irregularly distributed; manufacturing glass containers with non-parametric texture bas-relief motifs covering and concealing potential aesthetic manufacturing defects by means of an automatic process of molten glass compression and/or blow molding; automatically detecting and rejecting the containers having manufacturing dimensional and/or safety defects.

4 Claims, 12 Drawing Sheets

METHOD OF AUTOMATIC MASS PRODUCTION OF GLASS CONTAINERS, OBTAINED GLASS CONTAINERS AND MOLD FOR OBTAINING SAME

TECHNICAL FIELD

The present invention relates to the application of a non-parametric bas-relief texture in the automatic manufacture of molded glass containers. Said texture is obtained by molding whereby it will be possible to reproduce series of containers automatically and industrially with the same texture on their outer surface and is compatible with the functionalities of the areas considered to be susceptible to labeling or decoration.

In the present case, the texture is proposed to have a natural, non-geometric, non-parametric, and non-figurative appearance and is arranged randomly on at least one region of the outer surface of the container.

The texture motifs can reproduce any type of typical surface irregularities and defects of molded glass, such as for example scratches, pockets, ripples, hammered surface, orange peel, bubbles, or a combination of the foregoing. These motifs are particularly provided bas-relief and, in any case, without detriment to the areas considered susceptible to decoration or labeling of the container in any of the standard industrial labeling and decoration processes.

STATE OF THE ART

The technique of compressing and/or blowing a molten glass parison inside a mold, the inner molding surface of which defines the geometry of the outer surface of the container to be manufactured, is used for the most part in the automatic, industrial, mass manufacture of glass containers. If a texture is included on said inner molding surface, all the resulting containers will have said texture. This process is usually performed in a completely automatic manner.

Said technique of industrialized manufacture by molten glass compression and/or blowing always produces a percentage of containers with manufacturing defects, which are detected and rejected, and subsequently remelted as recycled raw material. Despite said recycling, the rejected containers significantly reduce manufacturing efficiency. In the industry today, between 15% and 35% of the bottles produced are usually rejected for presenting different kinds of defects, which makes the resulting product more expensive and increases contaminating emissions and, accordingly, the carbon footprint associated with each marketed container.

Some manufacturing defects are defects which affect product safety, where the container has critical defects and affect the integrity required for the container.

Other manufacturing defects are dimensional manufacturing defects producing alterations of the shape and/or geometry of the glass container above predefined tolerances and affecting the functionality of the container. For example, if the opening does not have a size within the expected tolerances, it can cause an imperfect or defective closure of the container with the cover, or if the base of the container is irregular it will hinder the container from standing upright. Other shape-related deformations can also hinder container automatic handling, packaging, labeling, screen printing, and/or stamping operations, which also represents a problem that affects their functionality. However, many other defects are simple aesthetic manufacturing defects producing visible marks and/or optical aberrations in the glass container. These aesthetic manufacturing defects affect the outer surface of the container but do not affect the functionality thereof, as the correct containment of their content, their safety and proper automatic handling, packaging, labeling, screen printing, and/or stamping of the containers with aesthetic defects are not affected, even though these containers are also rejected.

Those merely aesthetic defects are the cause of a high percentage of rejected containers, between 5% and 15% in the industry today, so a reduction or even the complete elimination of rejected containers due to merely aesthetic defects represents a large increase in the efficacy of manufacturing processes.

Aesthetic manufacturing defects have many possible causes, for example an incorrect molten glass and/or mold temperature setting, which can cause thermal shock or incorrect or non-uniform cooling of the glass, which usually produces ripples on the surface thereof, or they can be caused by impurities existing in the glass, or by flaws existing in the molds, or by incorrect handling of the container before its complete cooling, producing all types of visible marks, such as scratches, bubbles, etc.

These aesthetic manufacturing defects, which occasionally appear on the outer surface of containers, always have, due to their random origin, an irregular non-parametric, non-geometric, and non-figurative shape and are randomly distributed on the outer surface.

Molds are typically manufactured by reproducing the geometry of a parametric three-dimensional virtual model. The parametric three-dimensional virtual model defines the outer surface of the container, the surfaces of which are defined by parametric functions, i.e., said surfaces correspond to a more or less complex parametrizable geometric shape, such as, for example, a cylindrical shape, frustoconical shape, semispherical shape, a body of revolution of a generatrix, transition surfaces layouts, extrusion bodies, etc. Parametric three-dimensional virtual models are very precise, being the 3D modeling software standard of the industry dedicated to manufacturing molds for producing glass containers.

A parametric model will be a model in which the geometry of the model corresponds to an algorithmic scheme which allows parameters and rules defining and encoding the model to be expressed, such that a complex model is obtained from initial parameters that are much simpler than the model. Parametric functions allow much more complex models to be developed from said simple parameters. For example, a surface with a curvature can be defined as a mathematical function, without needing to determine the position of each and every one of the points of its surface.

Therefore, parametric models are those for which the rules and points of construction are relative to a parameter defined by an operator, designer, or creator.

Parametric modeling allows encoding certain geometries, which can have certain complexity, by means of said parametric functions. However, parametric modeling has also certain limitations, and its complexity greatly increases when it is intended to be used to describe non-artificial appearance geometries, such as certain irregular, more or less chaotic, or nature-inspired geometries, which greatly limits the creation of non-artificial appearance geometries by means of parametric models.

This means that any container manufactured with a mold obtained from a parametric three-dimensional virtual model can only be formed by parametric surfaces, and therefore by more or less complex geometric surfaces which can be defined by means of equations or algorithms but cannot include surfaces with a non-geometric and non-parametric shape.

Any texture that may have intentionally been included in said containers using the conventional method described above defining the geometry of the container through parametric algorithms by means of a computer program will be immediately distinguishable from possible randomly generated flaws or imperfections of the outer surface, because the shapes defined through parametric algorithms are immediately obvious and identifiable to the naked eye as non-random motifs which follow a pattern, even when the motif defined through parametric algorithms is intended to have a non-geometric appearance, for example, imitation of a natural or organic motif. This is because the use of parametric functions only allows simple geometries, with low and limited detail resolution, because the human brain is very effective at detecting patterns, even when they are not patterns that are obvious to the naked eye, which allows discerning between random patterns and non-random patterns, even when such patterns attempt to simulate certain randomness.

Containers including protruding texts or logos on their surface or including striated or diamond-shaped patterns on their surface, obtained by molding and therefore susceptible to being mass produced, are known.

However, the textures included in these bottles are geometric or parametric, modular, or regular layouts, so any random imperfection or flaw on the outer surface of the bottle will be immediately evident. Therefore, in bottles of this type the percentage of bottles that are rejected in the manufacturing process will likewise be high.

In some cases, bottles including a protruding motif with a more irregular appearance have also been marketed, such as for example one that simulates irregular broken tile mosaic surfacing.

However, although these textures have an irregular appearance, they are not really made up of non-geometric motifs not susceptible to being parameterized, as they are made up of flat mosaic pieces with a polygonal perimeter with a limited number of sides, undoubtedly fewer than ten sides. Motifs of this type can be defined through parametric algorithms and can therefore be included in the parametric three-dimensional virtual model described above. This causes the random imperfections and flaws produced on the bottle to also stand out with respect to said textures having an irregular appearance, but with geometric shapes susceptible to being parameterized.

Therefore, in this case, the inclusion of said irregular textures does not allow reducing the percentage of bottles rejected in the manufacturing process due to the inclusion of flaws and imperfections either.

There are many other equivalent examples of bottles with apparently organic or figurative textures, for example, bottles which simulate knotted ropes, snake skins, or other textures and have the same problem, as manufacturing imperfections will be evident on said textures.

Protruding organic textures are also known to be included on the surface of a glass container by molding. The inclusion of protruding motifs impedes placing labels in any one area of the outer surface and makes it necessary to make texture-free exceptions on said outer surface which determine the size and position of the label.

All the examples described up to this point include protruding motifs, which hinders the adhesion of labels on the outer surface, so the texture can only be included in regions with texture of the outer surface where labels are not intended to be included, which often makes it necessary to create exceptions, or areas without texture, with the precise shape, size, and position of the label, hindering labeling processes and making the product more expensive, furthermore impeding one and the same mold being used for manufacturing bottles for different brands, as each brand has a particular distinctive label with a different shape, size, and position.

Bottles with engraved motifs are also known, some of such bottles having drawings and spun glass threads, for example, with floral motifs, but said motifs are engraved on the outer surface of the bottle after they are manufactured by means of a subsequent engraving process, impeding the mass production of said bottles or making it more expensive. Furthermore, the depth and width of said engraving performed after the manufacture is usually determined by the size of the engraving tool, rendering uniformity to all the engraved motifs, which again makes imperfections and defects with respect to said engraved motifs distinguishable.

Based on the foregoing, it is concluded that there are no known bottles which include a texture that allows imperfections and flaws characteristic of glass industrially manufactured by molding to be concealed, allowing the integration of said imperfections with said texture, thereby reducing the percentage of manufactured bottle rejects with the subsequent economic and ecological benefits this entails.

Nor are there any known bottles with non-parametric textures susceptible to decoration, integrating textures on which labels of any size can be adhered and/or on which different motifs can be screen printed or stamped, in any position of the region with texture of the outer surface of said bottle, allowing a mass production of one and the same bottle with one and the same mold for multiple companies with different decorations.

These and other problems are solved by the proposed invention.

BRIEF DESCRIPTION OF THE INVENTION

The present invention relates to the content of the attached claims.

According to a first aspect, the present invention relates to a method of automatic mass production of glass containers with a texture on at least one region with texture of the outer surface.

A method of automatic mass production will be understood to mean a method which allows many units identical to one another, all of them including the same texture, to be manufactured automatically, i.e., by means of automatic production machinery which requires little to no human intervention for producing each individual container.

The proposed method includes the following steps, which are known in the state of the art:

producing a mold with a molding cavity defined by an inner surface including a texture at least in a region with texture of the inner surface;

manufacturing glass containers by means of an automatic process of molten glass compression and/or blow molding within the inner cavity of the mold, producing containers including a texture at least in a region with texture of an outer surface of the glass container;

automatically detecting and rejecting manufactured containers having manufacturing dimensional and/or safety defects causing alterations of the shape and/or geometry of the glass container above predefined tolerances.

According to the foregoing, a mold including a texture on an inner surface of the molding cavity of the mold will be manufactured, and once the mold is obtained, it will be used for the automatic mass production of multiple glass containers, all of them including a texture in at least one region with texture of their outer surface which reproduces in an inverted manner the texture of the inner surface of the mold.

The automatic mass production of glass containers typically comprises a first compression molding of the opening of the container in a compression mold, generating a parison, and then the insertion of the parison in a blow mold where the parison is expanded by blowing within the molding cavity of said blow mold, defining the shape, size, and texture of the outer surface of the container against the inner surface of the mold. Any texture included on the inner surface of the blow mold will be reproduced, in an inverted manner, on the outer surface of the produced container.

The mold will typically be formed by at least two complementary halves which can be opened to facilitate removal of the container from therein.

The automatic detection of containers having manufacturing defects usually involves the use of skilled operators, cameras, or other optical sensors and software which analyzes the information obtained from said cameras or optical sensors for the detection of dimensional defects, for example comparing the obtained images with reference images. Those containers having dimensional defects above predefined tolerance thresholds are rejected. Defects can affect the container as a whole or parts thereof. For example, in the opening tolerances are usually much smaller since the correct closure of the container is essential and largely depends on dimensional and shape-related precision of its opening, and therefore the automatic detection of dimensional manufacturing defects is usually concentrated in said area of the opening.

The present invention also proposes, in a manner known in the known state of the art, that the method include the following:

producing the mold comprises creating the mold including, on said inner molding surface, the texture in the form of non-parametric three-dimensional motifs by means of protuberances projecting from said inner surface of the molding cavity, with said non-parametric motifs being irregular, non-geometric, and non-figurative and being irregularly distributed over the region with texture, producing, during the step of manufacturing containers, containers with at least one region with texture including a texture formed by non-parametric bas-relief motifs covering and concealing potential aesthetic manufacturing defects causing visible marks and/or optical aberrations in the glass container.

The motifs of the texture will be non-parametric motifs, i.e., motifs the complexity of which is such that it prevents defining, without a loss of resolution, each of said motifs and the relative position thereof in the form of parameters and rules.

In parametric motifs, the parameters and rules defining the texture allow the extension of said texture to be increased simply by applying the same parameters and rules on the new area to be covered with the texture, so the result is predictable.

In contrast, in non-parametric motifs, each motif constituting the texture and the position thereof is completely independent of the other motifs of the texture, without parameters or rules binding them, so each motif has to be defined individually, and the extension thereof requires a task of individually defining each of the new motifs added, without the result being, therefore, predictable seeing the initial texture.

This characteristic of the unpredictability of textures with non-parametric motifs is what allows aesthetic manufacturing defects to be concealed, because if a texture with parametric motifs is applied, since the texture is somewhat predictable by the observer, even at an unconscious level, it would cause the aesthetic manufacturing defects to stand out and be readily identified by the observer because they do not follow the parameters and rules defining the rest of the texture.

By better concealing aesthetic manufacturing defects, tolerances for such defects can be much higher, or complete tolerance for any aesthetic defect can even be applied, provided that it does not produce alterations in the shape or geometry of the container above certain tolerances which could jeopardize its functionality, in which case they will be considered dimensional and/or safety defects.

This allows the containers that are rejected to be reduced, because aesthetic manufacturing defects, which usually cause the rejection of the containers that contain them, which can reach up to 15%, can be accepted as a result of the present invention, thereby increasing the productivity of a production plant that implements the present method, reducing unit costs for each container and its environmental impact in a significant manner.

The inclusion of camouflaging motifs of this type on the region with texture of the outer surface of the container allows any accidental aesthetic manufacturing defect in said region with texture to be camouflaged and concealed, integrating said aesthetic manufacturing defects as part of the texture from which they will not stand out as they are of the same nature.

This solution also allows the service life of reusable containers which are prone to having flaws such as scratches or scuffmarks on their outer surface due to their continued use to be prolonged.

The motifs making up the texture are three-dimensional motifs which are not protruding, but rather represent voids with an irregular bottom on the outer surface of the container, with the outer surface being the outermost part of the container.

On one hand, this allows the outer surface to be accessible to a user without interferences from the texture, which will be recessed into the thickness of the enclosure wall.

On the other hand, motifs of the texture constitute a local reduction in the thickness of the glass with respect to the mean thickness of the container as a whole, allowing a reduction of the amount of glass of the container, with the subsequent financial savings and lower carbon footprint.

Each motif of said texture will therefore represent a local thinning of the thickness of the glass wall of the container. This offers a better feel to the container and avoids problems in manufacturing lines and transport, because since the texture is recessed, it will not contact or affect devices in charge of moving the containers, an operation that occurs at a very high speed in modern automated production lines.

Irregular three-dimensional motifs will be understood to mean those motifs having different sections at different depths, in a non-repetitive manner devoid of symmetries, and with a not necessarily planar irregular bottom, with the different motifs of the texture being different from one another and therefore not repetitive. Non-geometric motifs are those motifs devoid of symmetries, and the perimetral shape of which cannot be precisely defined with names of geometric figures whether they are regular, such as, for example, triangle, square, rectangle, rhombus, pentagon, hexagon, circle, etc., or irregular, such as, for example, quadrilateral, tetragon, hexagon, etc. The rounding of edges or vertexes of geometric figures does not prevent defining said motifs in geometric terms. Polygons, for example, with more than twenty sides will no longer be considered geometric motifs.

Irregular motifs can further have a three-dimensional dimension that is likewise not susceptible to parametrization given that they do not correspond to regular or known geometric figures, and they cannot be defined by their degree of complexity either by means of parametric values because they do not correspond to any pattern.

Non-figurative motifs are those motifs which do not reproduce an object, plant or animal, letters or numbers, or parts thereof. Figurative motifs can be, among many others and only by way of example, shapes of leaves, flowers, fruits, whole or cut fruits, shapes of animals or parts of an animal such as torsos, hands, faces, bones, shells, shapes of buildings or of parts of buildings such as a brick wall, or other different kinds of objects such as masks, chains, ropes, anchors, hearts, armors, coats of arms, etc. Letters from any alphabet and numbers are also considered figurative motifs. It will also be understood that irregular textures present on surfaces of plants, animals, and minerals, separated from the shape of said plants, animals, or minerals, do not constitute figurative motifs.

As mentioned above, during the manufacture or handling of glass containers aesthetic manufacturing defects causing visible marks and/or alterations in the appearance and/or in the transparency of the glass container or imperfections on the outer surface thereof can be produced, causing optical aberrations, which usually causes them to be rejected, with the subsequent economic loss. Said defects or imperfections always have, given their nature, a non-parametric, random, irregular, non-geometric, and non-figurative shape.

Therefore, since motifs making up the texture are irregular, non-parametric, non-geometric, and non-figurative, they allow covering and concealing dimensional manufacturing defects accidentally produced on the outer surface of the container which, due to their accidental origin, will also be irregular, non-parametric, non-geometric, and non-figurative, helping them to go unnoticed within the texture, reducing rejected containers.

According to a preferred embodiment, only dimensional manufacturing defects are automatically detected and rejected, completely ignoring aesthetic manufacturing defects, thereby reducing rejected containers.

Preferably, the method further includes automatically labeling the container at least on a part of the region with texture by means of the adhesion of a label and decorating by means of screen printing and/or by means of stamping. That is possible as a result of the use of a bas-relief texture, which does not complicate the tasks of applying labeling.

Applying labeling on the region with texture allows precise alignment of the container with the automatic device for applying labeling to be rendered unnecessary, since the labeling can be applied without any problems on the region with texture, without needing to create exceptions devoid of texture for applying the labeling, which allows the labeling application speed to be increased and again reduces possible manufacturing defects and potential rejected containers.

Furthermore, this enables customizing one and the same bottle with a specific texture with different decorations, such as for example different labeling or screen printing, because since the application of labeling on the region with texture is allowed, the region with texture is separated from the decorated region, which thereby allows one and the same container, with the same texture, to be used for different purposes, conferring to it a different appearance by means of the decoration superimposed on the texture, thereby increasing manufacturing volumes and lowering the price thereof.

It is also proposed for the region with texture of the inner surface of the mold to have, between the protruding non-parametric motifs, spaces devoid of protrusions. Said spaces constitute unaltered areas of the inner surface within the region with texture, which allow, during the step of manufacturing containers, containers to be produced with spaces devoid of bas-relief in unaltered areas of the outer surface of the container, within the region with texture. Said unaltered areas have a smooth and exposed finish and allow the automatic decoration of the container either by means of adhering labels or applying screen printing or stamping to be improved, as they offer, within the region with texture, surfaces that are accessible and devoid of bas-relief texture on which the decoration can be applied without interference from the texture.

It is considered preferable for the means thickness of the glass in the unaltered areas to be equal to or less than the mean thickness of the glass of the container.

Preferably, the unaltered areas of the inner surface of the mold represent at least 10% or at least 15% of the surface of the region with texture, which is considered a surface sufficient for achieving correct adhesion of a label, or a surface sufficient for stamping or screen printing to be applied in a recognizable manner.

According to one embodiment, the unaltered areas are connected to one another.

The step of producing the mold is also proposed to comprise the following steps:

obtaining a three-dimensional virtual model which reproduces the outer surface of the mass-produced container to be manufactured and/or the inner surface of the mold to be produced, defined as a point grid;

editing the three-dimensional virtual model by incorporating, in said point grid, the texture of non-parametric motifs; and creating the mold by means of an automatic manufacturing machine tool supplied with said three-dimensional virtual model.

Molds are typically manufactured by reproducing the geometry of a parametric three-dimensional virtual model. The parametric three-dimensional virtual model defines the outer surface of the container, the surfaces of which are defined by parametric functions, i.e., said surfaces correspond to a more or less complex geometric shape, such as for example a cylindrical shape, frustoconical shape, semi-spherical shape, a body of revolution of a generatrix, etc. Parametric three-dimensional virtual models are very precise and require little memory for the management thereof, so they can be created and edited with simple and therefore cost-effective computers.

This means that any container manufactured with a mold obtained from a parametric three-dimensional virtual model can only be formed by parametric surfaces, and therefore by more or less complex geometric surfaces that can be defined by means of an algorithm but cannot include surfaces with a non-geometric and non-parametric shape.

The present invention proposes using a three-dimensional virtual model defined as a point grid instead of a parametric three-dimensional virtual model. The point grid requires higher computational capacity for management thereof, particularly with dense point grids, preferably with tiles smaller than $0.2 \text{ mm}^2$ or smaller than $0.1 \text{ mm}^2$ but allow a completely free edition of the surface thereof, where any type of non-parametric textures can be applied in an artistic manner by means of editing programs.

Once the three-dimensional virtual point grid model has been obtained and said point grid incorporating the texture of non-parametric motifs has been edited, the mold is manufactured from said three-dimensional virtual model by means of a machine tool, typically a subtractive machine tool, such as a numerical control grinder, or an additive machine tool, such as a three-dimensional printer.

The result will be a mold with a molding cavity defined by an inner surface provided with protuberances forming the texture of non-parametric protruding motifs.

According to a preferred embodiment, non-parametric motifs constituting the texture will be reproductions of aesthetic manufacturing defects and/or reproductions of natural textures with an irregular pattern.

Reproductions of aesthetic manufacturing defects can be defined, for example, by local ripples or depressions with an irregular edge and depth on the outer surface of the container which produce variations in the thickness of the glass, causing optical aberrations.

Reproductions of aesthetic manufacturing defects can also be defined by scores or scratches which generate channels with an irregular edge and depth on the outer surface of the container.

Reproductions of aesthetic manufacturing defects can also be defined by bubbles or pockets which generate local voids with an irregular edge and depth on the outer surface of the container.

Reproductions of natural textures with an irregular pattern may be selected, for example, from leather, wood, tree bark, slate stone, cracked dry ground, orange peel, melon peel, sponge, or coral.

The present invention also relates to a glass container resulting from the automatic mass production produced according to the method described above. The proposed container comprises an outer surface including at least one region with texture with a texture obtained by molding.

The region with texture will include a texture formed by irregular non-parametric, non-geometric, and non-figurative bas-relief motifs irregularly distributed over the region with texture covering and concealing potential aesthetic manufacturing defects causing visible marks and/or optical aberrations in the glass container.

The container may further include labeling formed by a label, screen printing, and/or stamping applied at least on a part of the region with texture of the outer surface of the container, which may be applied automatically as a result of the motifs being bas-relief motifs. The label may be a non-elastic label and/or a paper label.

The region with texture of the outer surface of the container preferably has, between the non-parametric bas-relief motifs, spaces devoid of bas-relief and constituting unaltered areas of the outer surface within the region with texture for applying labeling. Preferably, the unaltered areas of the outer surface of the container represent at least 10% or at least 15% of the surface of the region with texture.

The present invention also relates to a mold for automatic mass production of glass containers according to the method described above. The proposed mold comprises an inner molding cavity defined by an inner surface including at least one region with texture with a texture to be molded.

The region with texture may include a texture formed by irregular, non-geometric, non-figurative, and non-parametric protruding motifs irregularly distributed over the region with texture, which allow the manufacture of a glass container with at least one region with texture with non-parametric bas-relief motifs covering and concealing, in manufactured containers, potential aesthetic manufacturing defects causing visible marks and/or optical aberrations in the glass container.

The region with texture of the inner surface of the mold preferably has, between the protruding non-parametric motifs, spaces devoid of protr and constituting unaltered areas of the inner surface within the region with texture, producing, during the step of manufacturing containers, containers with spaces devoid of bas-relief in unaltered areas of the outer surface of the container, within the region with texture, where the labeling is to be applied.

The unaltered areas of the inner surface of the mold represent at least 10% or at least 15% of the surface of the region with texture.

BRIEF DESCRIPTION OF THE FIGURES

The aforementioned and other advantages and features will be more fully understood from the following detailed description of an embodiment in reference to the attached drawings, which must be taken in an illustrative and non-limiting manner and in which.

DETAILED DESCRIPTION OF AN EMBODIMENT

The attached figures show illustrative and non-limiting embodiments of the present invention.

Figure 1:
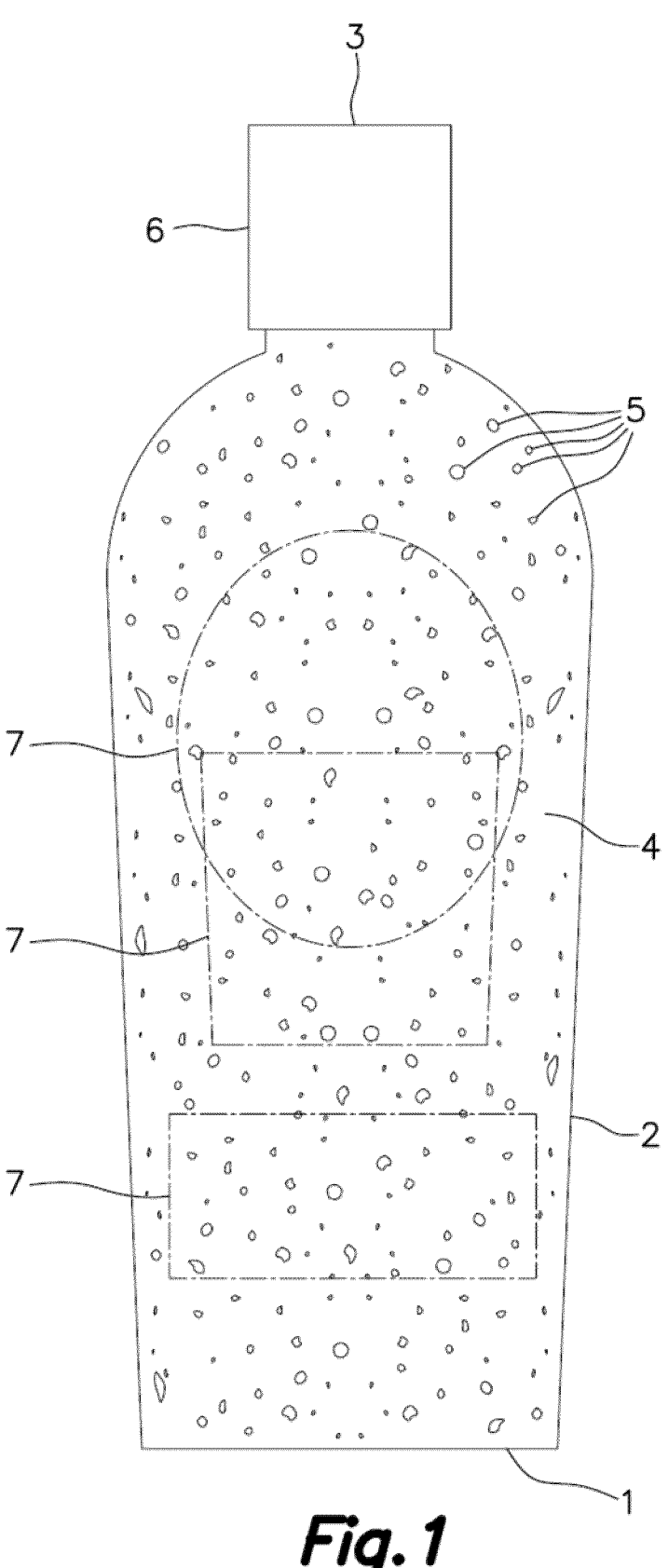
FIG. 1 schematically shows a container in the form of a bottle the outer surface of which has a texture made up of motifs in the form of pockets.

According to a first embodiment shown in FIG. 1, the container is a bottle provided with a base 1 and a tubular enclosure wall 2 connecting the base 1 with an opening 3, defining a hollow interior accessible through said opening 3.

The enclosure wall 2 has a narrowing defining shoulders and a bottle neck ending with said opening 3.

A neck finish 6 in the form of a protruding annular flange made of the same glass constituting the enclosure wall 2, forming a thickening of said enclosure wall 2, is arranged around the bottle neck.

The outer curve of the enclosure wall 2 constitutes an outer surface 4 accessible from outside the bottle.

Said outer surface 4 includes, at least on part of its surface corresponding to a region with texture, recesses involving a local thinning of the thickness of the enclosure wall 2, and the shape of which determines three-dimensional bas-relief motifs 5 constituting a texture.

Figure 2:
FIGS. 2, 3, 4, and 5 correspond to enlarged views of the lower part of a container, including textures made up of pocket, orange peel, hammered, and scratch textures, respectively.

In the example shown in FIGS. 1 and 2, said motifs 5 are three-dimensional compact shapes having an irregular contour and bottom and variable sizes and depths, and the distribution thereof on the outer surface is also irregular.

In this example, each of said motifs 5 resembles a pocket, i.e., a cavity which could be caused by an air bubble, a vapor bubble or other intrusions or impurities in the glass when it is hardened. Some of said cavities can be grouped together and partially overlap one another, forming nodes.

In this example, most of the motifs 5 have a surface area of less than 1 mm$^2$, although some exceed a surface area of 5 mm$^2$.

The inclusion of a label 7 on the container, covering part of the outer surface 4, is also contemplated. As a result of the motifs 5 being bas-relief motifs, the label 7 can be of any size and be positioned on any part of the outer surface 4, even covering parts of the region with texture, because the label 7 will be adhered to the outer surface 4 without the bas-relief motifs hindering said adhesion. FIG. 1 shows three possible examples of labels, indicated with a discontinuous line.

Figure 3:

FIG. 3 shows an alternative embodiment in which the texture is formed by motifs 5 reproducing a texture in the form of orange peel, with each motif 5 in this example having a surface area of less than 5 mm$^2$.

Figure 4:

FIG. 4 shows an embodiment of the hammered texture, which is formed by motifs in the form of depressions of little depth and a large surface area, typically greater than 10 mm$^2$, and edges that are not well defined, and the motifs 5 can partially overlap one another.

Figure 5:
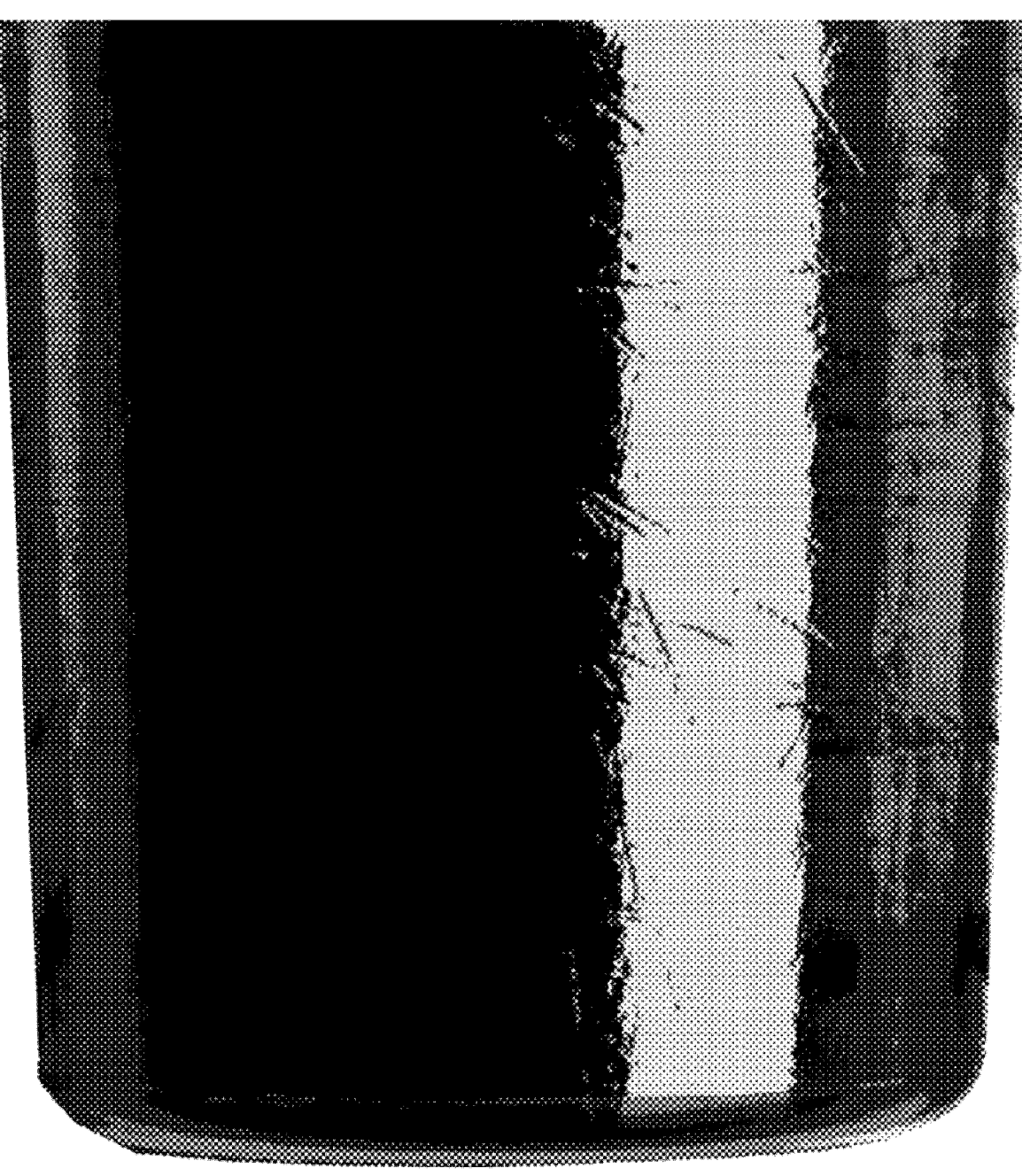
Figure 6:
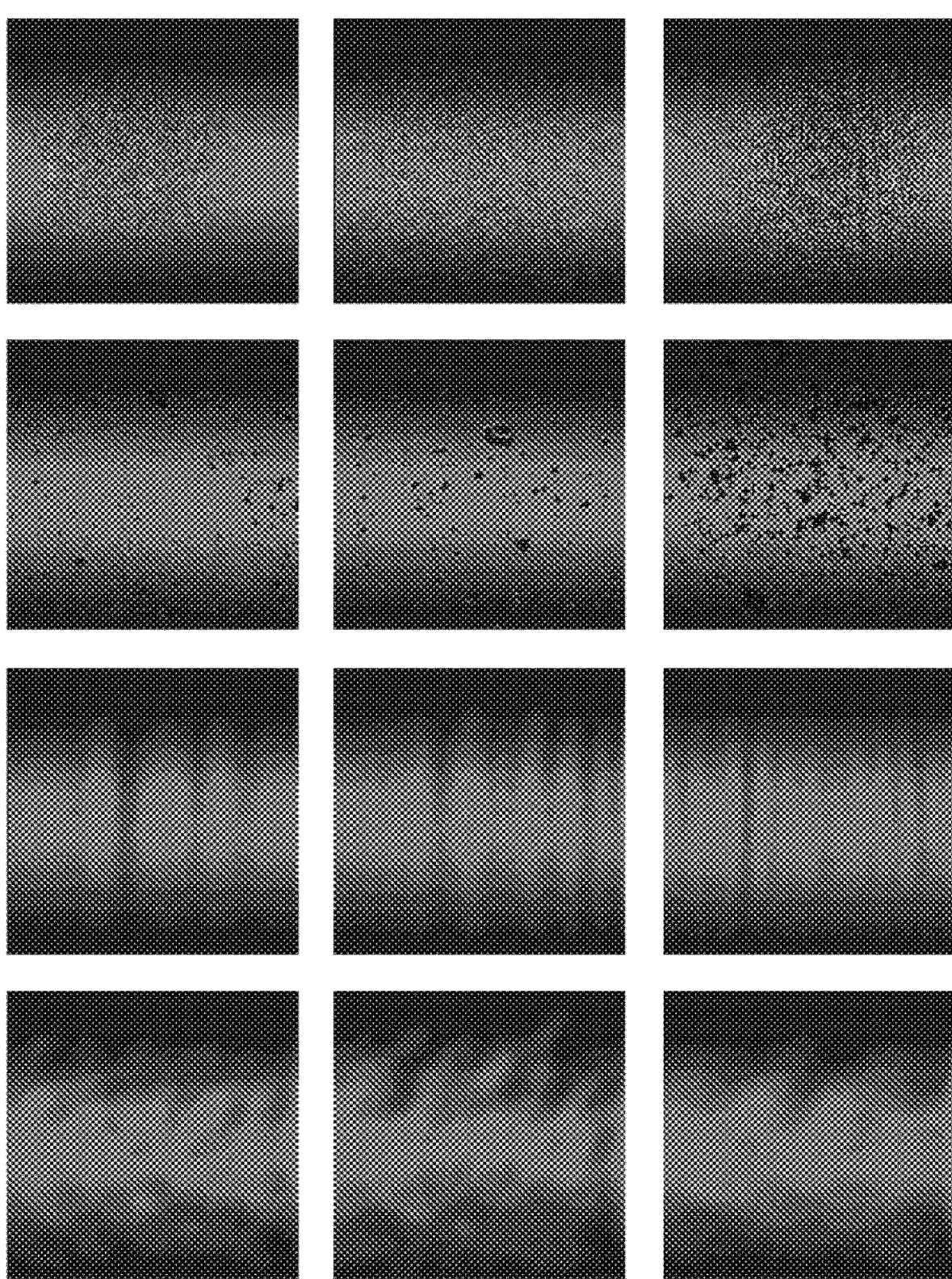
FIG. 6 shows a selection of four possible textures, each with three possible densities and/or size of motifs, with the four possible textures corresponding, from top to bottom, to orange peel, pocket, ripple, and hammered textures.
Figure 7:
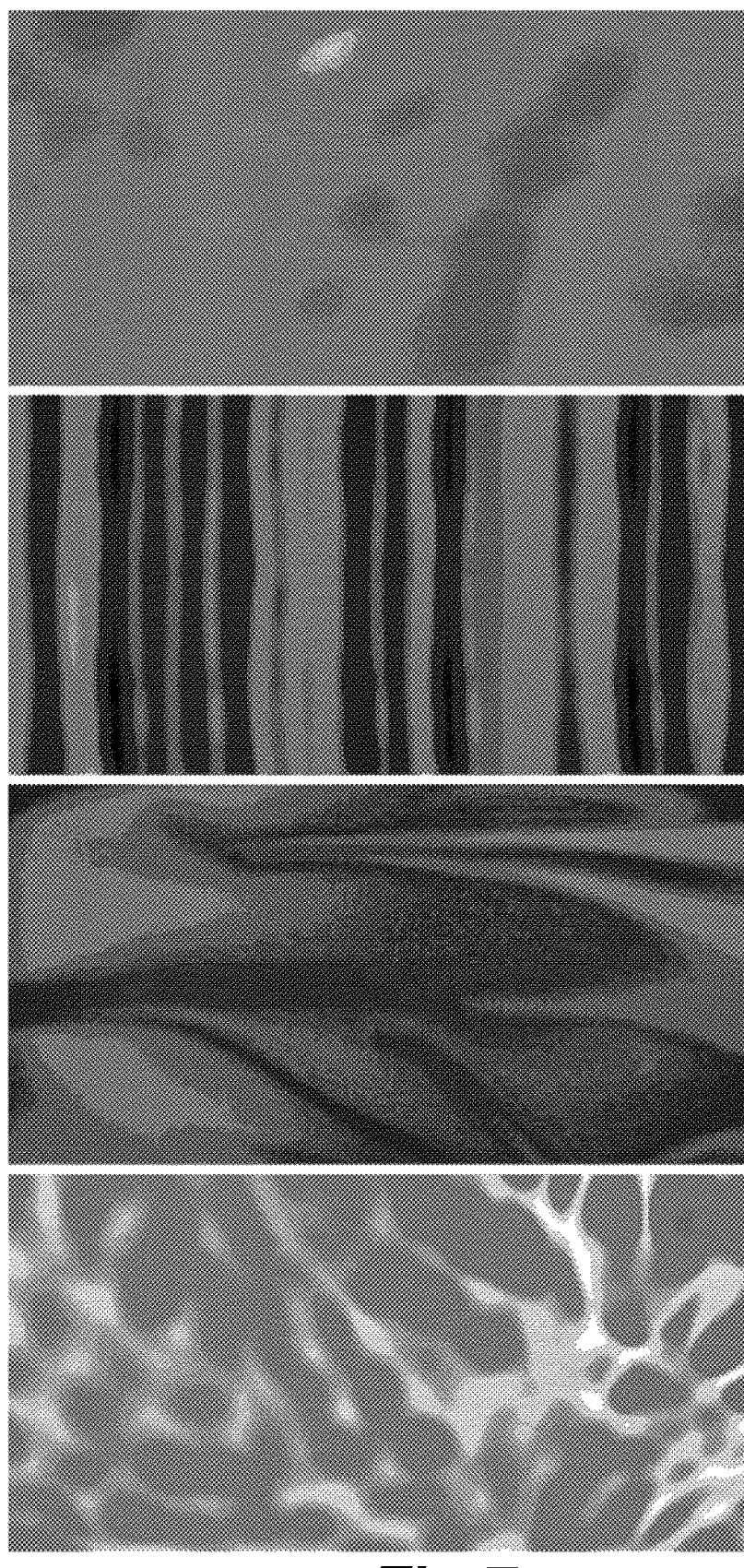
FIG. 7 shows four possible examples of ripple textures.
Figure 8:
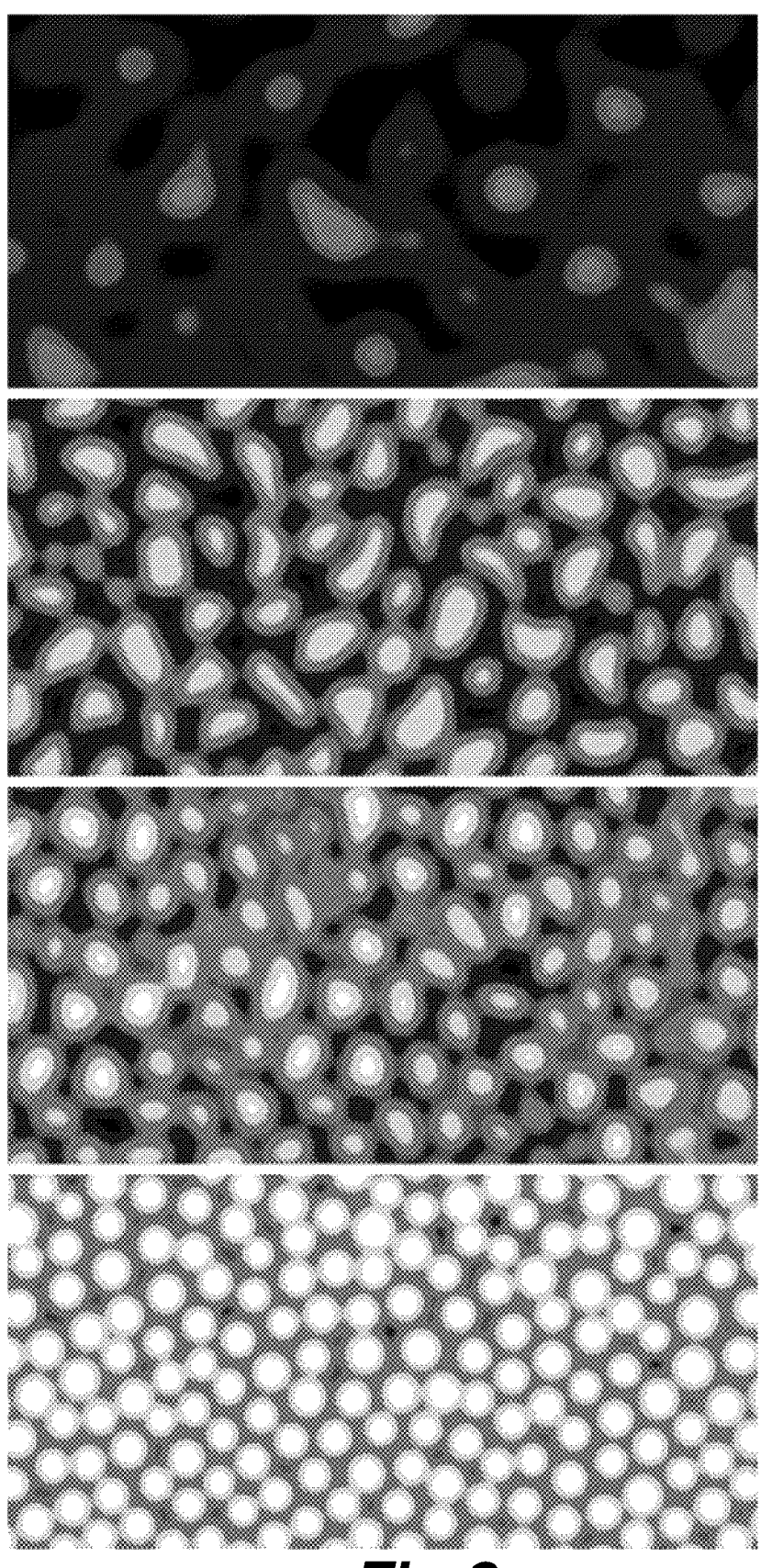
FIG. 8 shows four possible examples of hammered textures.
Figure 9:
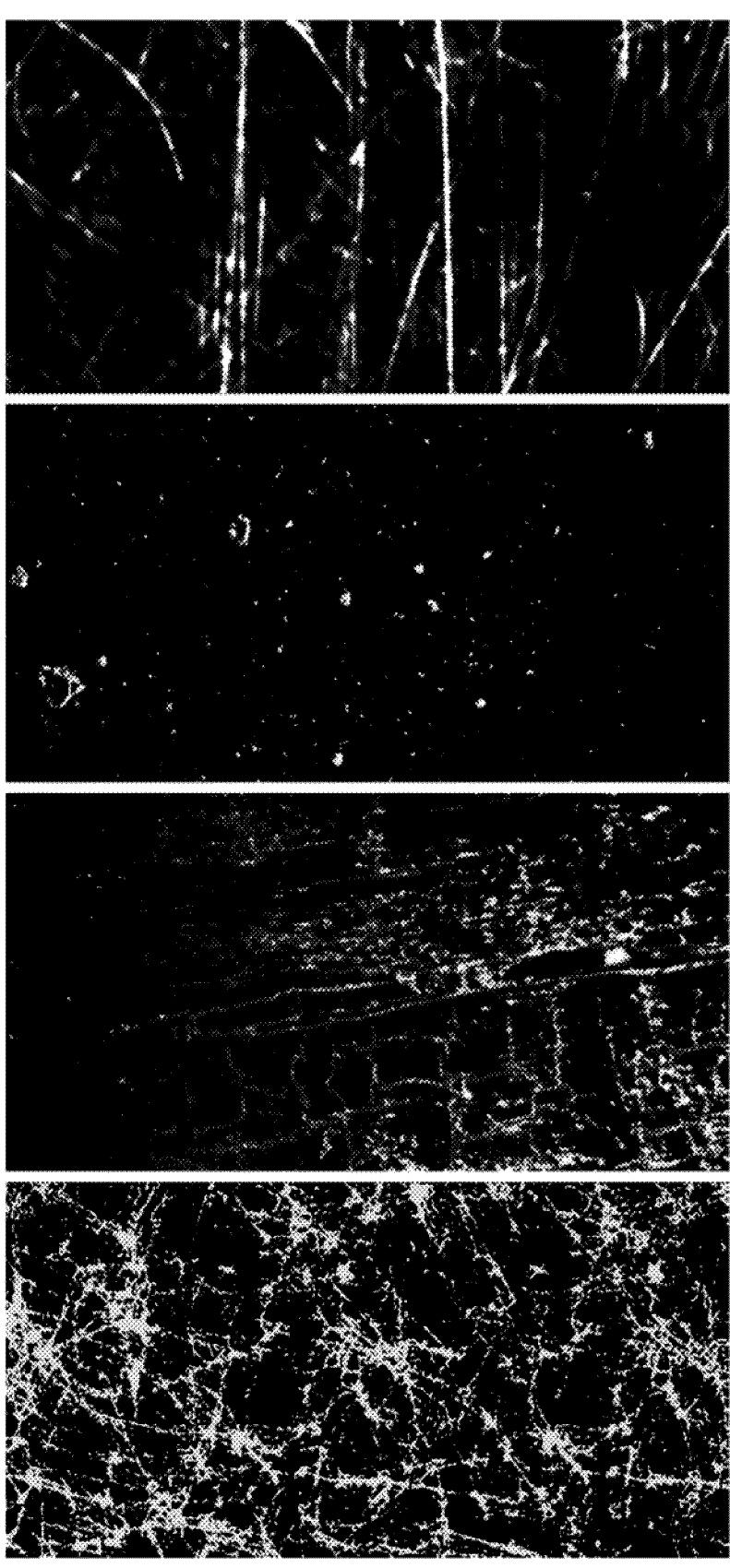
FIG. 9 shows four possible examples of scratch textures, the lower one corresponding to the aforementioned skin.
Figure 10:
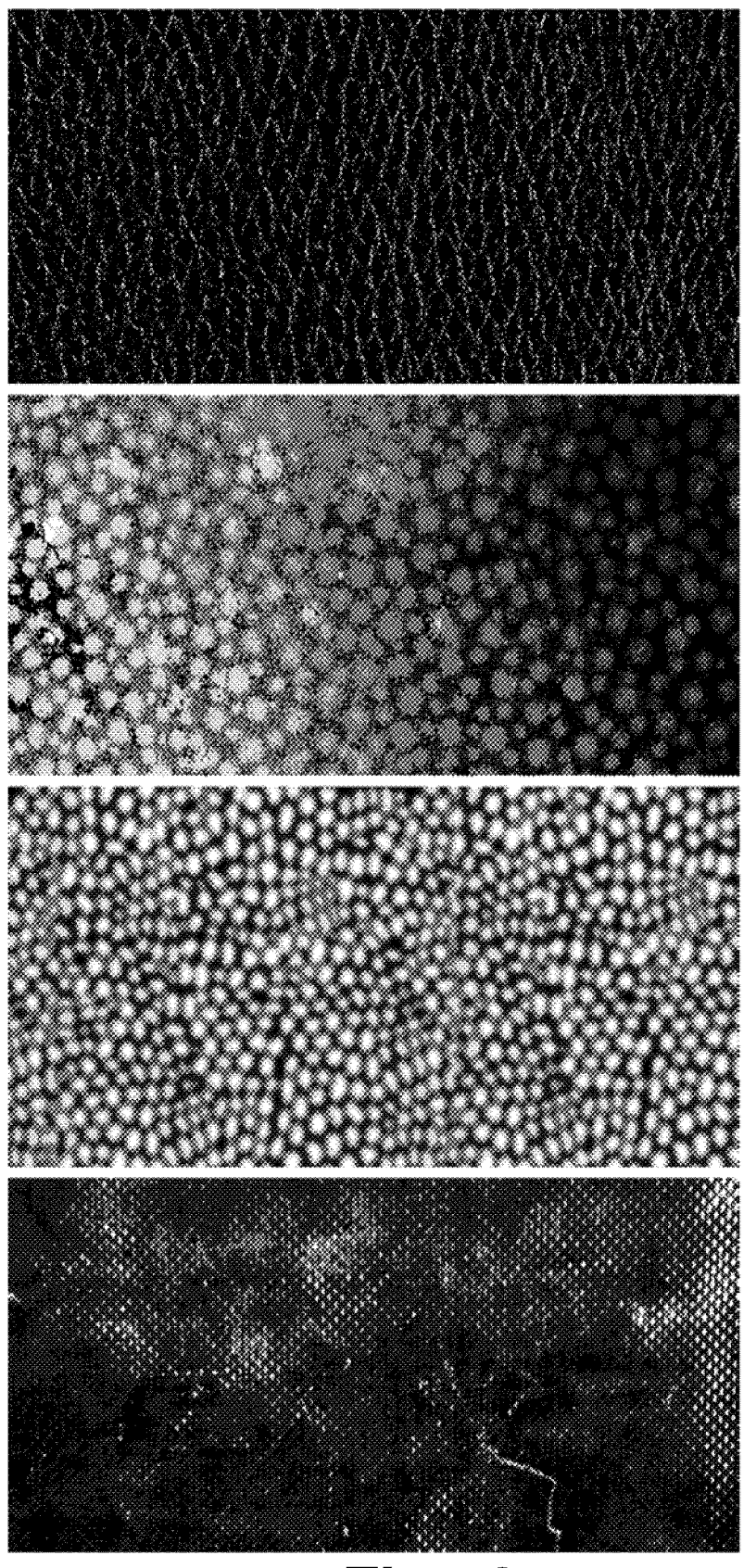
FIG. 10 shows four possible examples of orange peel textures.
Figure 11:
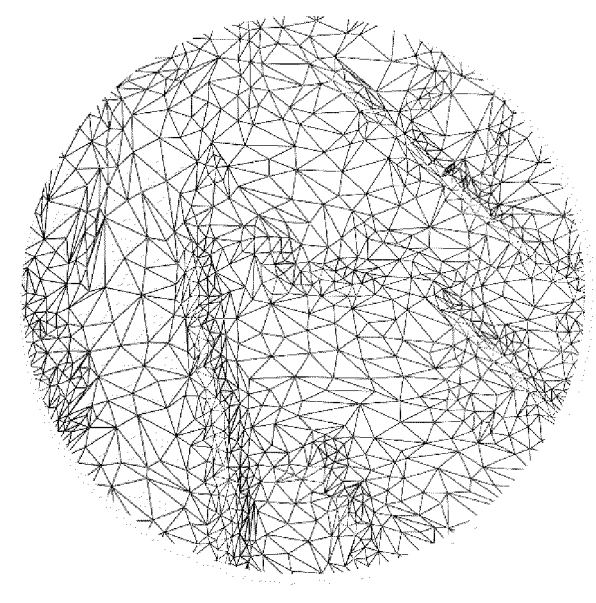
FIG. 11 shows a view of part of the textured virtual model defined by a point grid, and of an enlargement of a region of said textured virtual model, indicated with a white circle, where it can be seen that the motifs of the texture are scratches.
Figure 11:
Figure 12:
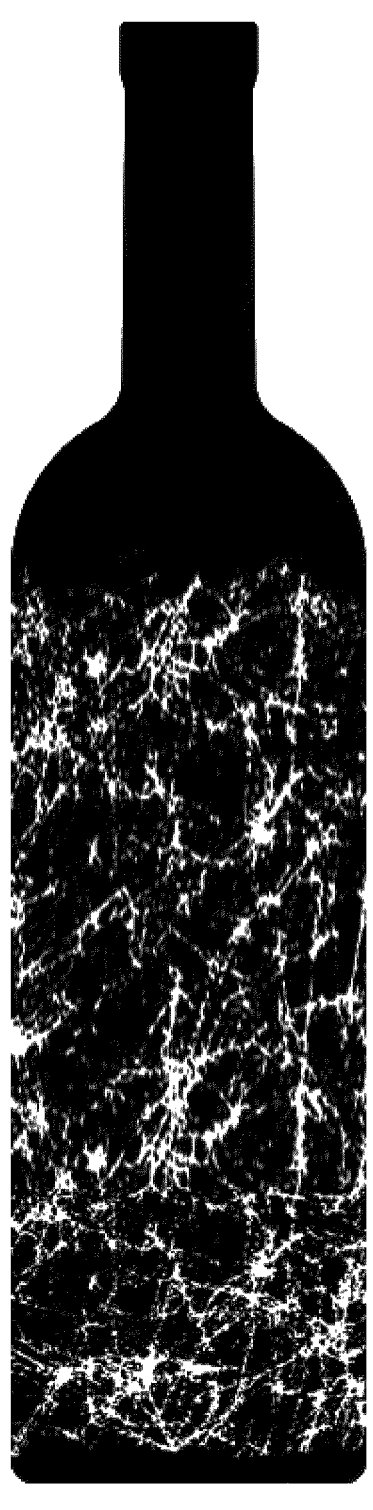
FIG. 12 shows a schematic view of a container in the form of a bottle including a texture, corresponding to the previously described elephant skin texture, in a region with texture of its outer surface.

FIG. 5 shows an embodiment according to which the motifs 5 constituting the texture are in the form of scratches, each one made up of an elongated, narrow groove having defined edges.

Other examples of possible textures are shown in the remaining figures.

The invention claimed is:

1. A glass container resulting from automatic mass production comprising:

an outer surface including at least one region with texture, each region with texture including a texture obtained by molding formed by irregular, non-geometric, non-figurative, and non-parametric three-dimensional, bas-relief motifs irregularly distributed over the region with texture covering and concealing potential aesthetic manufacturing defects causing visible marks in the glass container;

the non-parametric bas-relief motifs are reproductions of aesthetic manufacturing defects, the bas-relief motifs being irregularly distributed over the region with texture covering and concealing aesthetic manufacturing defects causing visible marks in the glass container.

2. The container according to claim 1, wherein the region with texture include, between the non-parametric bas-relief motifs, unaltered areas devoid of bas-reliefs exposed in regards the surrounding bas-relief motifs; and the container further includes a paper label, screen printing, and/or stamping attached to or applied on the unaltered areas of at least a part of the region with texture of the outer surface of the container.

3. The container according to claim 1, wherein the unaltered areas of the outer surface of the container represent at least 10% or at least 15% of the surface of the region with texture.

4. The container according to claim 1 wherein the non-parametric bas-relief motifs are defined by:

local ripples or depressions with an irregular edge and depth on the outer surface of the container which produce variations in the thickness of the glass; and/or reproductions of aesthetic manufacturing defects defined by scores or scratches generating channels with an irregular edge and depth on the outer surface of the container; and/or reproductions of aesthetic manufacturing defects defined by bubbles or holes generating local voids with an irregular edge and depth on the outer surface of the container.

* * * * *